United States Patent
Lojewski

(10) Patent No.: US 9,792,162 B2
(45) Date of Patent: Oct. 17, 2017

(54) NETWORK SYSTEM, NETWORK NODE AND COMMUNICATION METHOD

(71) Applicant: Fraunhofer-Gesellschaft zur Förderung der angewandten Forschung e.V., München (DE)

(72) Inventor: Carsten Lojewski, Kaiserslautern (DE)

(73) Assignee: Fraunhofer-Gesellschaft zur Förderung der angewandten Forschung e.V., München (DE)

( * ) Notice: Subject to any disclaimer, the term of this patent is extended or adjusted under 35 U.S.C. 154(b) by 304 days.

(21) Appl. No.: 14/078,917

(22) Filed: Nov. 13, 2013

(65) Prior Publication Data

US 2015/0134841 A1    May 14, 2015

(51) Int. Cl.
*G06F 15/17* (2006.01)
*G06F 9/52* (2006.01)
*H04L 29/08* (2006.01)
*G06F 9/54* (2006.01)

(52) U.S. Cl.
CPC .............. *G06F 9/526* (2013.01); *G06F 9/544* (2013.01); *H04L 69/321* (2013.01); *G06F 2211/005* (2013.01)

(58) Field of Classification Search
CPC ......................................................... G06F 1/12
USPC ......................................................... 709/228
See application file for complete search history.

(56) References Cited

U.S. PATENT DOCUMENTS

| | | | |
|---|---|---|---|
| 5,875,343 A | 2/1999 | Binford et al. | |
| 7,143,410 B1 | 11/2006 | Coffman et al. | |
| 7,278,062 B2 | 10/2007 | Moyer et al. | |
| 7,509,419 B2 * | 3/2009 | Elnozahy | H04L 49/351 709/203 |
| 7,539,780 B2 | 5/2009 | Makhervaks et al. | |

(Continued)

OTHER PUBLICATIONS

"Asynchronous I/O", Wikipedia, the free encyclopedia, the version last modified on Nov. 2, 2013 at 10:39; http://en.wikipedia.org/wiki/Asynchronous_I/O, (Nov. 2, 2013), 7 pgs.

(Continued)

*Primary Examiner* — Vivek Srivastava
*Assistant Examiner* — Sibte Bukhari
(74) *Attorney, Agent, or Firm* — Schwegman Lundberg & Woessner, P.A.

(57) ABSTRACT

Network system being configured to execute I/O commands and application commands in parallel and comprising a network and at least one network node, wherein the at least one network node is connected to the network via a network adapter and is configured to run several processes and/or threads in parallel, wherein the at least one network node comprises or is configured to establish a common communication channel (C-channel) to be used by the several processes and/or threads for data communication with the network via the network adapter, wherein the C-channel comprises or is established to comprise a work queue (WQ) for execution of I/O commands and a completion queue (CQ) for indication of a status of I/O commands, and wherein the at least one network node, especially its comprised or to be established C-channel, is configured for an exclusive access of precisely one single process or thread out of the several processes and/or threads to the CQ of the C-channel at a particular time.

19 Claims, 12 Drawing Sheets

(56) References Cited

U.S. PATENT DOCUMENTS

Figure 1:
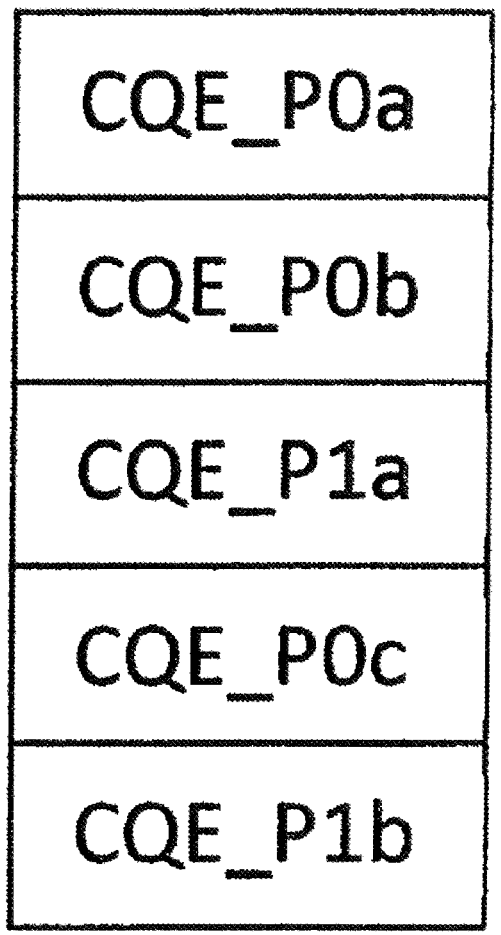

| | | | |
|---|---|---|---|
| 8,510,738 | B2 | 8/2013 | Rogers et al. |
| 9,003,131 | B1 | 4/2015 | Lunev |
| 2003/0023786 | A1 | 1/2003 | Craddock et al. |
| 2003/0061417 | A1 | 3/2003 | Craddock et al. |
| 2006/0095606 | A1 | 5/2006 | Emmes et al. |
| 2006/0168070 | A1* | 7/2006 | Thompson ............. G06F 9/542 709/206 |
| 2006/0282498 | A1* | 12/2006 | Muro ..................... H04L 67/34 709/203 |
| 2015/0143384 | A1 | 5/2015 | Lojewski |

OTHER PUBLICATIONS

"Circular Buffer", Wikipedia—The Free Encyclopedia, version which was last modified on Sep. 23, 2013 at 15:28; http://en.wikipedia.org/wiki/Ring_buffer, (Sep. 23, 2013), 10 pgs.

"Daemon (Computing)", Wikipedia—the Free Encyclopedia, version last modified on Oct. 15, 2013 at 04:50; http://en.wikipedia.org/wiki/Daemon_(computing), (Oct. 15, 2013), 4 pgs.

"Fabric Collective Accelerator™ (FCA)", Copyright 2011 Mellanox Technologies, Software Product Brief, (2011), 2 pgs.

"InfiniBand Architecture Specification", vol. 1, Release 1.1, Copyright 1999, 2001, 2002 by InfiniBand Trade Association, (Nov. 6, 2002), 1303 pgs.

"InfiniBand Architecture Specification", vol. 2, Release 1.1, Copyright 1999, 2001, 2002 by InfiniBand Trade Association, (Nov. 6, 2002), 700 pgs.

"Lock-Free Multi-Producer Multi-Consumer Queue on Ring Buffer", Linux Journal, Issue Apr. 2013, (Apr. 2013), 20 pgs.

"Monitor (Synchronization)", Wikipedia—the Free Encyclopedia, version last modified on Nov. 4, 2013 at 23:02; http://en.wikipedia.org/wiki/Monitor_(synchronization), (Nov. 4, 2013), 23 pgs.

"Mutual Exclusion", Wikipedia—the Free Encyclopedia, version last modified on Oct. 28, 2013 at 11:07; http://en.wikipedia.org/wiki/Mutual_exclusion, (Oct. 28, 2013), 4 pgs.

"SpinLock", Wikipedia—the Free Encyclopedia, version last modified on Oct. 20, 2013 at 03:35; http://en.wikipedia.org/wiki/Spinlock, (Oct. 20, 2013), 4 pgs.

"Using the GNI and DMAPP APIs", Copyright 2010, 2011 Cray Inc., S-2446-3103, (Mar. 2011), 239 pgs.

"U.S. Appl. No. 14/081,791, Non Final Office Action dated Mar. 15, 2016", 19 pgs.

\* cited by examiner

NETWORK SYSTEM, NETWORK NODE AND COMMUNICATION METHOD

The present invention relates to a network system, a corresponding network node and a corresponding communication method. The network system, the network node and the method allow the management of ordered and fault tolerant operations.

Networks such as the one which is used in the network system according to the invention can execute I/O commands (such as read, write, send, receive, atomic operation, . . . ) in parallel with actively running calculations. Processor units within such networks and the network nodes thereof, respectively, which initiate these operations can overlap calculations with the communication of data. This can significantly increase the overall efficiency of computer programs. Most of the state of the art advanced networks (which allow multi-protocol transport and/or RDMA operations and/or which have atomic operations and/or a complex network topology) expect the I/O commands to be executed in work queues (WQ) and to indicate the status of operations back through completion queues (CQ) to the calling process. Such prior art networks are for example described in

[1] InfiniBand Architecture Specification, Infiniband Trade Assocation, vol. 1, Release 1.1, InfiniBand Trade Assocation, Oct. 24, 2000,

[2] InfiniBand Architecture Specification, Infiniband Trade Association, vol. 2, Release 1.1, InfiniBand Trade Association, Oct. 24, 2000,

[3] CrayDoc, Using the GNI and DMAPP APIs, S-2446-3103, March 2011.

State of the art processors (in network nodes or in clients/servers connected to the network via these network nodes) are based on multicore architectures and enable the parallel execution of program sequences. On the other hand, a concurrent access of parallel running processes or threads on the WQ or CQ is not defined at all and therefore critical. Furthermore, the underlying network topology (for example 3D torus) or dynamic network routing can lead to disordered message arrival. If a receiver (network node or computer connected thereto) expects sensitive data directly at specific memory addresses to control a program flow, an erroneous program execution or a program crash can be the result. If an outage or a network failure results due to damaged or faulty hardware, it is important that a fault-tolerant system responds to these events to allow a stable and controlled program execution.

It is therefore an object of the present invention to provide a computer implemented network system, a corresponding computer implemented network node and a corresponding computer implemented communication method which enable a defined concurrent access of processes and/or threads to work queues and to completion queues (i.e. an access in which the status of each process and each thread is well defined at any time). It is also an object of the present invention to allow ordered, one-sided and fault-tolerant asynchronous I/O operations on all network topologies for the network system and the communication method according to the invention. (In general, asynchronous I/O operations are, according to the invention, uncoupled read/write operations (I/O: in/out) or also atomic operations on memory addresses: at first, an instruction is issued (for example: "read" or "write") and then the load to execute the instruction is transferred to another entity. At a later moment, then only the status of the operation is inquired.) Finally, it is an objective of the present invention to allow a concurrent access to asynchronous communication units and communication devices, respectively (such as computers, smartphones, televisions, and so on) which are configured for parallel execution of program sequences.

These objectives are solved by the network system according to example 1, the network node adapted to be contained in such a network system according to example 20 and the communication method according to example 21. Advantageous aspects and/or embodiments are described in the dependent examples and in the subsequent description.

Hereinafter, the present invention is at first described in general, then in exemplary embodiments. According to the invention as is defined by the claims, single features of the invention do not have to be realized as is shown in the exemplary embodiments. Single features shown in an embodiment can also be omitted or combined with other features of the invention (as for example shown in another embodiment) in a different manner.

A network system according to the invention is described in independent example 1.

Therein, applications running on the network (for example applications residing in the node(s) and communicating, via processes and/or threads, with the network adapter and therefore, via the network adapter, with the network) can trigger, via the I/O commands, an I/O operation and/or can trigger, via the application commands, the running of calculations. I/O commands can therefore also be regarded, in the present invention, as an arbitrary I/O operation to be performed on the network.

The network node(s) may comprise a memory in which the C-channel is established.

"Is to be established", "is to be configured", "is configured to establish" or the like means (in the present invention) that the corresponding entity (for example: the C-channel) does not need to be configured in the described manner from the beginning on, but the described configuration can also be invoked automatically when the corresponding device (such as the network node) is turned on (by appropriate programs which are, for example, pre-implemented in a read-only-memory of the device and which are automatically started after power-on).

According to the invention, the WQ and the CQ of the network node can be combined and transferred into a common communication channel, the said C-channel (by storing the WQ and the CQ and their components such as work queue elements and completion queue elements, in a common, previously allocated memory area; see also the dependent examples and the subsequent description). Preferably, the C-channel comprises or consists of precisely one single work queue and comprises or consists of precisely one single completion queue. Normally, the completion queue indicates the status of the I/O commands inserted (by one or several of the processes and/or threads) in the work queue and these I/O commands are those which are executed in or by the network system. That the C-channel comprises (or is established to comprise) the WQ and the CQ especially also includes that the C-channel consists of the WQ and the CQ without any further elements.

According to the invention, the exclusive access of the precisely one single process out of the several processes to the CQ (or to the CQ and to the WQ) of the C-channel at a particular time means that it is ensured that no concurrent process of the said single process can access the CQ (or the WQ or the CQ and WQ) at a moment at which the said single process accesses the CQ (or the WQ or the CQ and the WQ). In other words, for example due to the ownership of a synchronization primitive (see subsequent description), the calling, single one out of the several processes has exclusive access to the CQ (or to the WQ or to both queues) and no other process can interrupt. No two processes can access the CQ (or the WQ or both queues) at the same time. From the several processes which are configured to use the one C-channel, therefore, only the one single process which currently owns the synchronization primitive has access to/via the C-channel, whereas all other processes are locked (that means blocked from any access to the C-channel). The WQ and the CQ of the C-channel therefore belong to the single process currently owning the synchronization primitive.

The same (as aforementioned for processes) also holds for threads trying to access the network via the network adapter. (In general, in the present invention, processes have their own process space and are normally not able to access the process space and the memory addresses, respectively, of other processes. In contrast thereto, threads use the same address space and therefore are able to change the memory contents of other threads directly. In general, a master thread is allocated to each process. If this master thread generates further threads, these generated further threads inherit the process space from the master thread.)

First advantageous features which can be realised by the present invention are described in dependent example 2.

According to example 2, it is ensured that no concurrent process of the said single process can access the CQ and the WQ at a moment at which the said single process accesses the CQ or the WQ. In other words, for example due to the ownership of the synchronization primitive, the calling, single one out of the several processes has exclusive access to the CQ and to the WQ and no other process can interrupt this access. The same holds for threads.

Further advantageous aspects which can be realized by the present invention are described in the dependent examples 3 and 4. (Therein, this holds for all dependent examples in a similar manner, the aspects of dependent example 3 can be realized independently from the aspects according to example 4. The same holds for dependent example 4. However, also the aspects of both dependent examples can of course be realized in a network system according to the invention.)

According to example 4, the implementation of ring buffers or circular buffers is well-known for the skilled person: the basics of implementation are for example described in the Article "Circular Buffer" in the English part of "Wikipedia—The Free Encyclopedia" in the version which was last modified on 23 Sep. 2013 at 15:28. This article is hereby incorporated by reference in its entirety.

Further advantageous aspects that can be realized in the present invention are described in dependent example 5.

In accordance with the dependent examples 3 to 5, an application (that means a process or thread of an application) can trigger an I/O operation and I/O commands, respectively, by insertion of a work queue element (WQE) in the ring buffer of the WQ. The status of the I/O operation and I/O commands, respectively, is written by the network adapter and as completion queue element (CQE) in the ring buffer of the CQ (from there, the application or the process or thread thereof can inquire this status). With these two queues (WQ and CQ) which operate in an inverse manner and the ring buffers thereof, respectively, the present invention is able to perform an advantageous form of asynchronous I/O operations on the network.

The basics of how to perform and implement asynchronous I/O is well-known for the skilled person. These basics are described in the Article "Asynchronous I/O" in the English part of "Wikipedia—the Free Encyclopedia" in the version last modified on 2 Nov. 2013 at 10:39. This article is hereby incorporated by reference in its entirety.

The C-channel can, according to the present invention, additionally be configured for status queries in the CQ.

Further advantageous aspects which can be realized by the present invention are described in the dependent example 6.

The features of example 6 are preferably realized in combination with the features according to example 5. Consequently, if a synchronization primitive is used, then the synchronization primitive is not released (i.e. not de-blocked) before the last CQE has been removed from the CQ. That means that the precisely one single process or thread operating on the CQ removes not only those CQE from the CQ which have been initiated by this process or thread, but also removes all other CQE which have been initiated by other processes or threads.

Further advantageous aspects which can be realized by the present invention are described in the dependent example 7.

According to example 7, the one single (calling) process (or thread) which currently has (exclusive) access to the CQ (preferably: to both queues CQ and WQ of the C-channel) so that no other process (and/or thread) can interrupt this access, is in exclusive ownership of the synchronization primitive.

Further advantageous aspects which can be realized by the present invention are described in dependent example 8.

Consequently, if the WQ and CQ are, according to example 4, implemented or to be implemented based on two ring buffers, these two ring buffers are established together with the synchronization primitive in one single (i.e. the common) memory area. For all instances (i.e. processes or threads) which are allowed (one by one) to access the WQ and the CQ and their ring buffers, respectively, one single vector address is made visible so that there is only one single access (which is blocked by the synchronization primitive for all but one processes/threads).

The synchronization primitive (that, in general, provides atomicity) can be implemented in different forms: for example, a monitor (i.e. synchronization construct that allows processes and/or threads to have mutual exclusion, i.e. mutex, and the ability to wait (block) for a certain condition to become true), a mutex or a spinlock comprising the synchronization primitive can be realized to implement the aspects of dependent examples 7 and/or 8. The basics for implementation of monitors, mutexes and spin locks are well-known for the skilled person. These basics are described in the three Articles "Monitor (Synchronization)", "Mutual Exclusion" and "Spin Lock" in the English part of "Wikipedia—the Free Encyclopedia" in the versions last modified on 4 Nov. 2013 at 23:02 (Monitor (Synchronization)), last modified on 28 Oct. 2013 at 11:07 (Mutual Exclusion) and last modified on 20 Oct. 2013 at 03:35 (Spinlock). These three articles are hereby incorporated in reference in their entirety.

Further advantageous aspects which can be realized by the present invention are described in dependent example 9.

According to example 9, preferably, the implementation of the exclusive access uses the synchronization primitive as well as the unique counter.

Further advantageous aspects which can be realized by the present invention are described in dependent example 10.

Preferably, the WQ and the CQ are established or to be established together with the synchronization primitive and the unique counter in the aforementioned common memory area.

Further advantageous aspects which can be realized are described in dependent example 11.

Preferably, in case of using the synchronization primitive, the blocking is realized by not releasing the locked synchronization primitive of the C-channel. Then, in order to allow the further communication of processes and/or threads via the network, another C-channel has to be established by the same network node or another network node.

Further advantageous aspects which can be realized are described in the dependent example 12.

In accordance therewith, preferably, each of the C-channels is configured or is to be configured as is described for the C-channel in one of the preceding examples 1 to 11. If there are any communication problems of the node via a specific C-channel and/or network adapter, another C-channel can be established via another network node.

Further advantageous aspects which can be realised are described in the dependent examples 13 to 15.

According to example 15, before the process or thread enters the CQ, it normally initializes the timer function.

Further advantageous aspects are described in dependent example 16.

According to this example, the suspending is preferably done by releasing the synchronization primitive.

Further advantageous aspects that can be realized by the invention are described in dependent example 17.

According to this example, normally, if a process or thread tries to get the exclusive access and does not get it, there is a process or thread other than the process or thread that entered the CQ which has the exclusive access.

Further advantageous aspects which can be realized are described in example the dependent 18.

According to this example, preferably, all network nodes are configured to run daemon processes which are configured to allow the respective network node to get access to the C-channel of some or all other network nodes out of the several network nodes.

Finally, further advantageous aspects which can be realized are described in dependent example 19.

According to this example, preferably, the same is also established for the WQ (and not only for the CQ).

A network node according to the present invention is described in example 20. A communication method according to the invention is described in example 21.

Hereinafter, the present invention is described in detail based on exemplary embodiments. Therein, the figures show the following.

FIG. 1: An example for a CQ state (having five CQE in the CQ).

Figure 2:
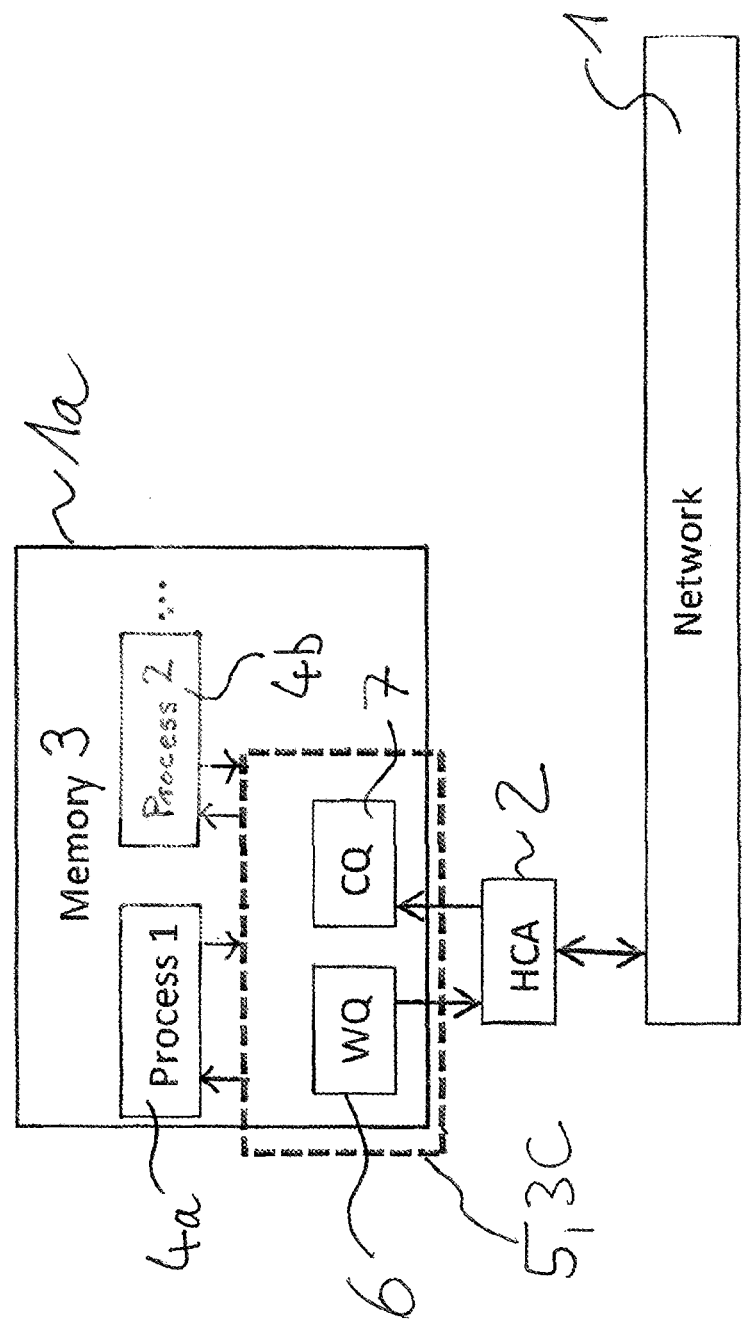

FIG. 2: The basic structure of a network system according to the invention.

Figure 3:
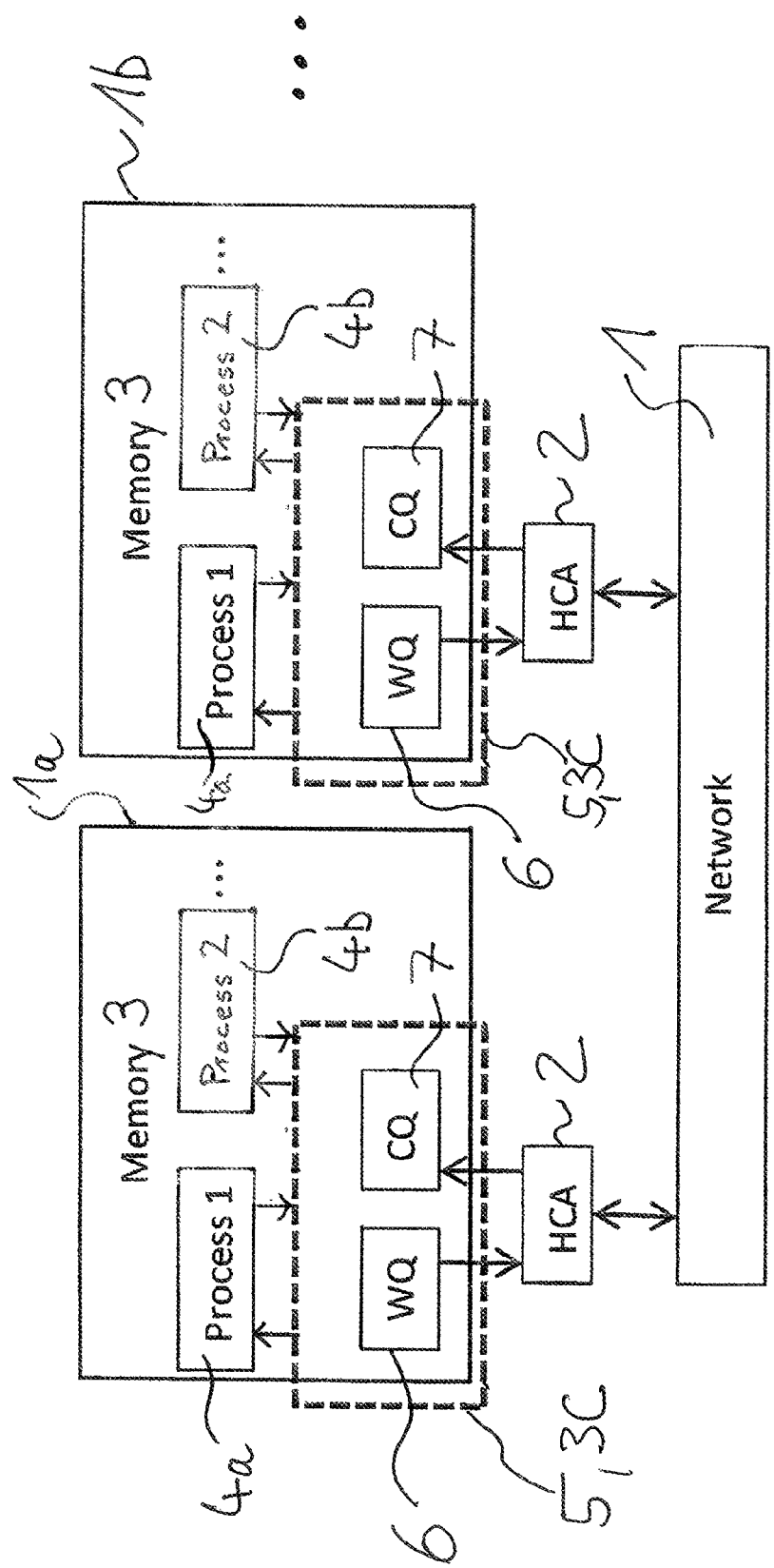

FIG. 3: An exemplary structure of a network system according to the invention with several network nodes.

Figure 4:
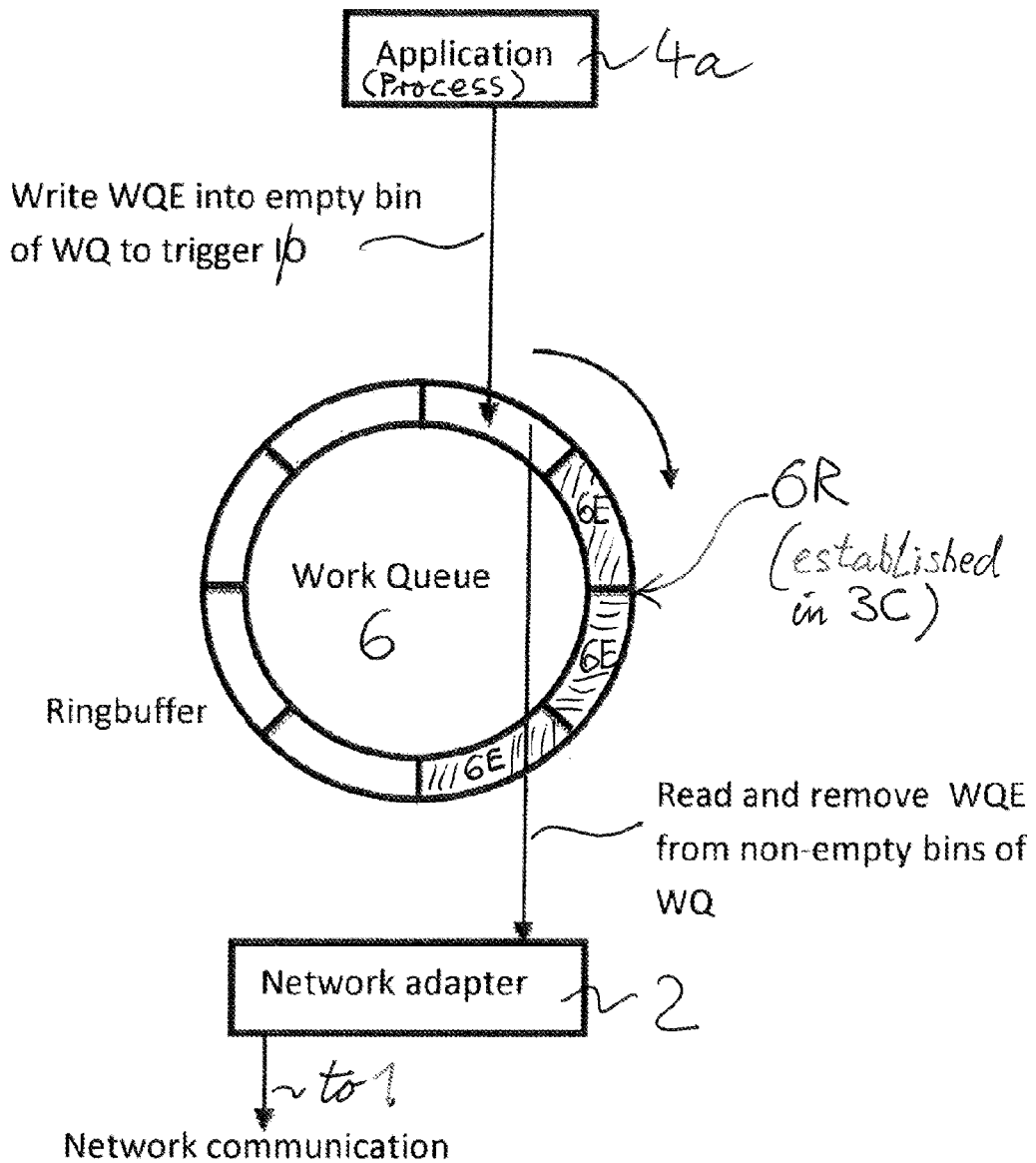

FIG. 4: A WQ realized in form of a ring buffer.

Figure 5:
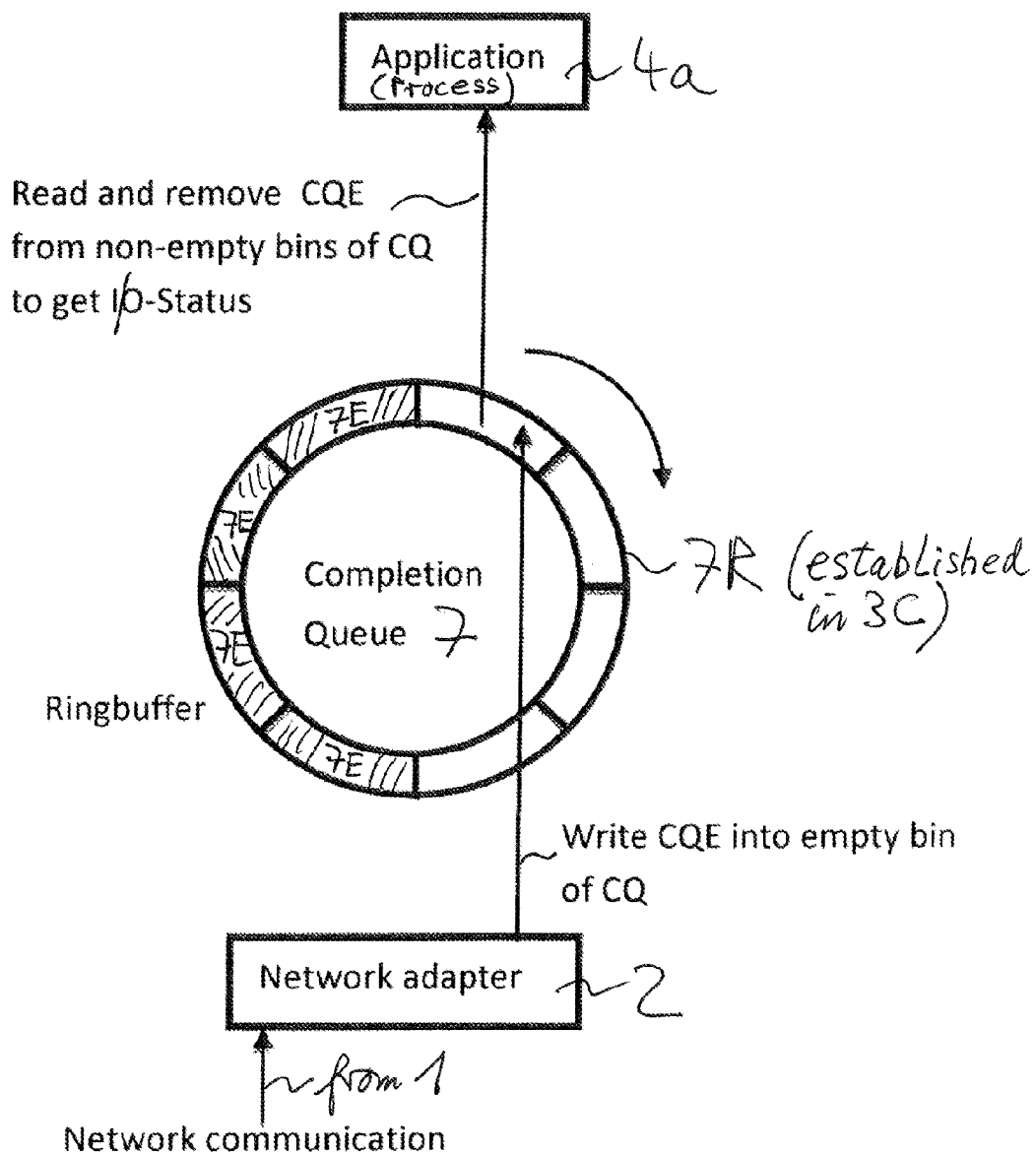

FIG. 5: A CQ realized in form of a ring buffer.

Figure 6:
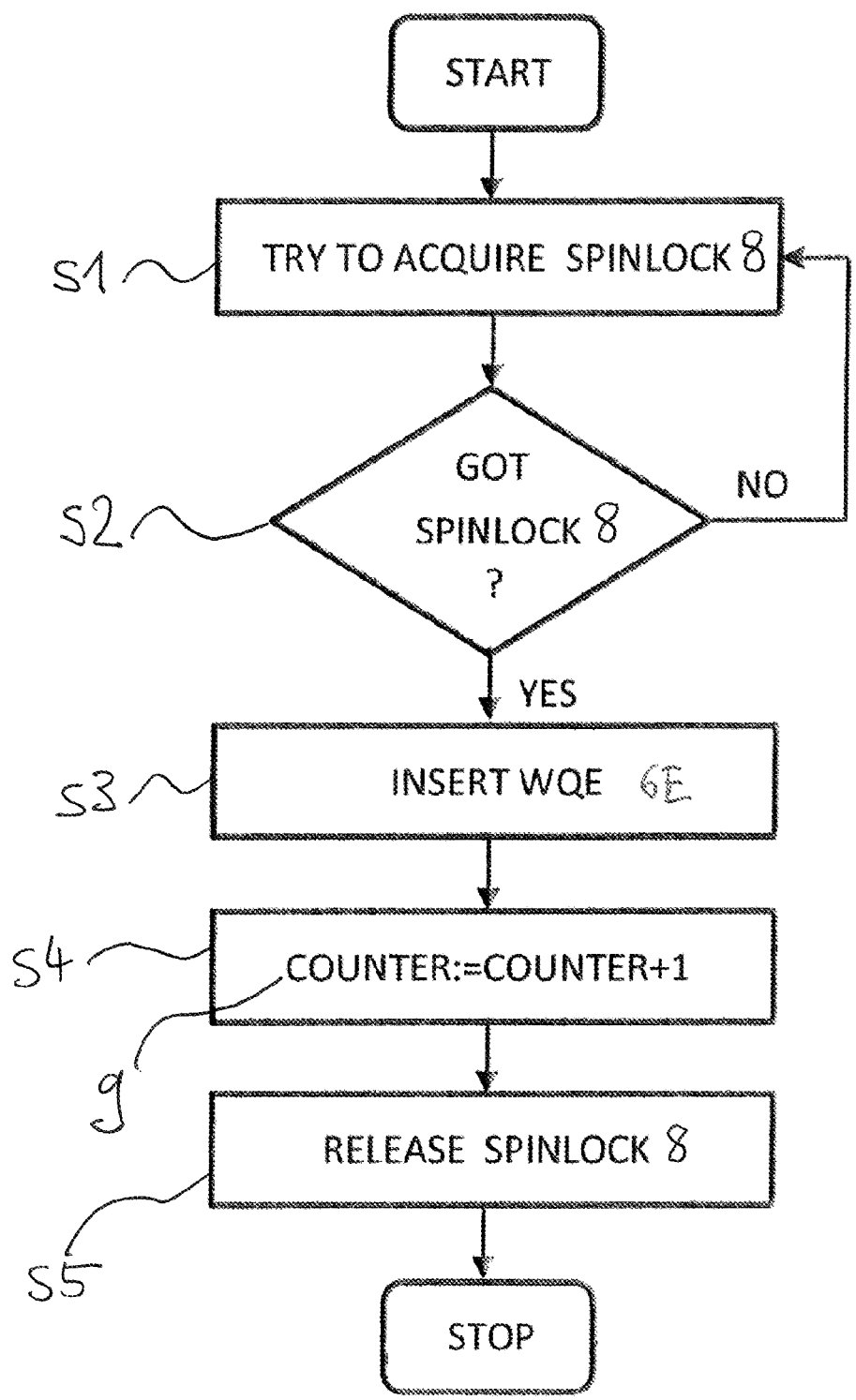

FIG. 6: An example for inserting a WQE into the WQ according to the invention.

Figure 7:
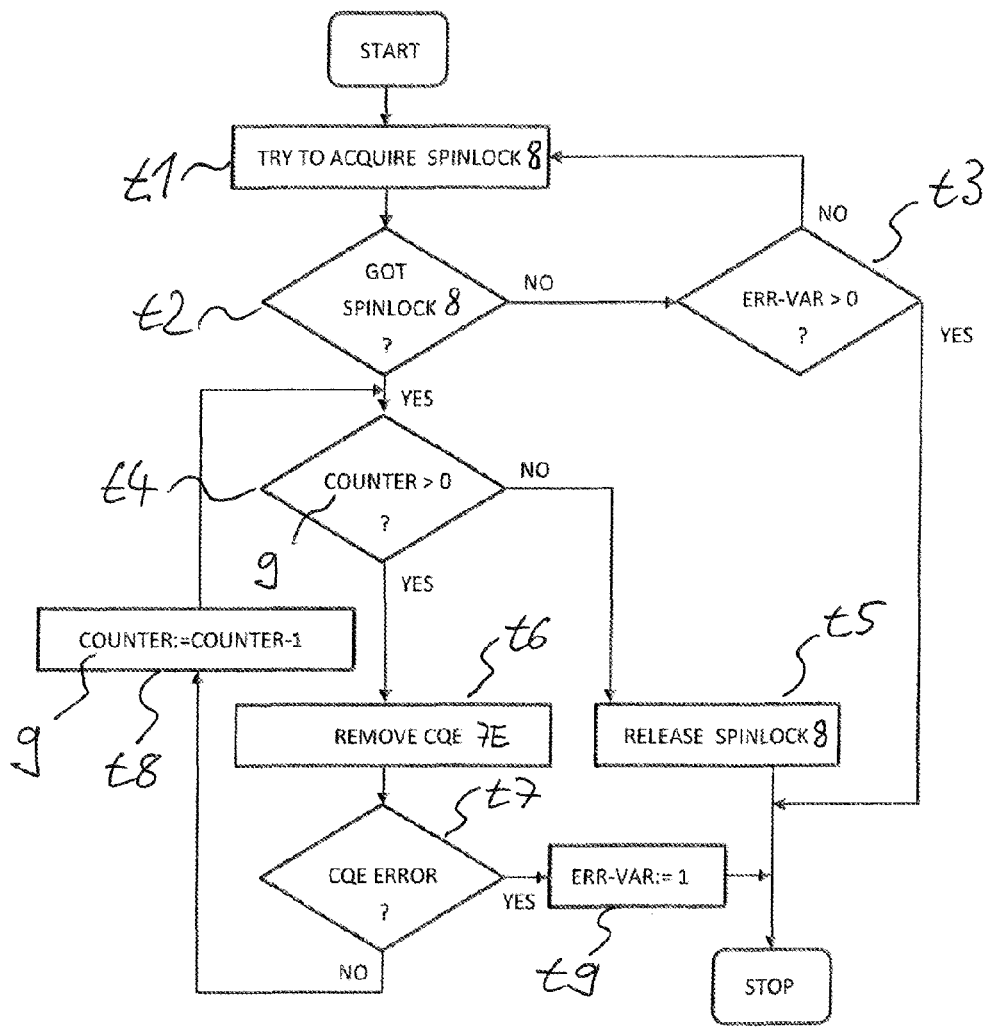

FIG. 7: An example for removing a CQE from the CQ according to the invention.

Figure 8:
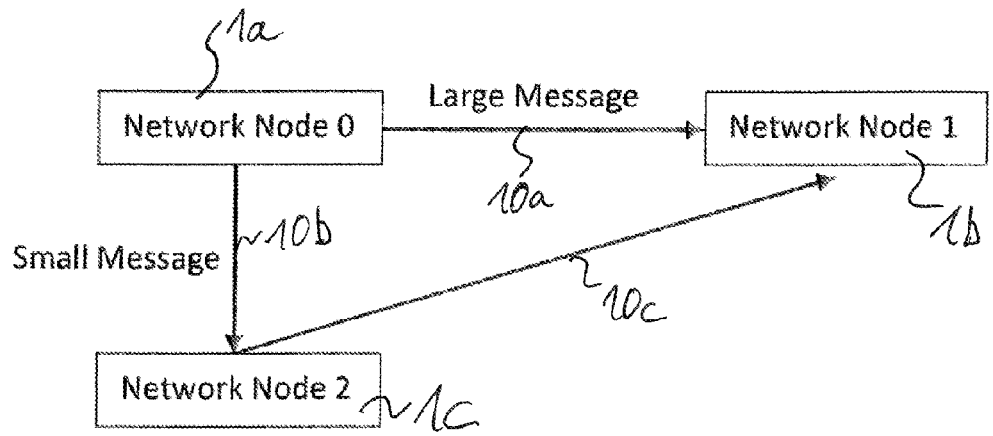

FIG. 8: An example for an (adaptive) message transport in the present invention.

Figure 9:
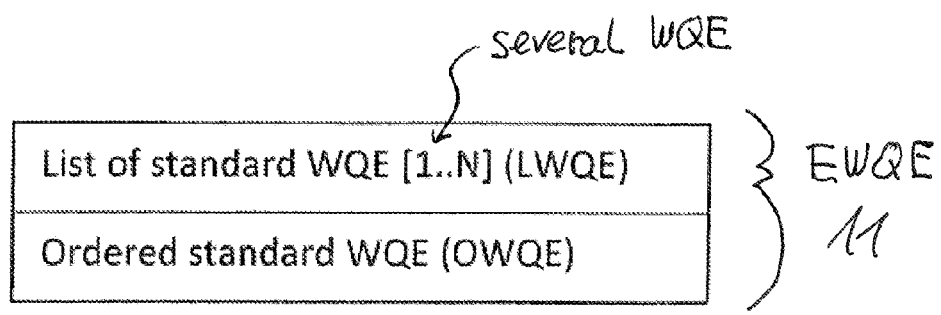

FIG. 9: An example of an extended WQE (EWQE) according to the invention.

Figure 10:
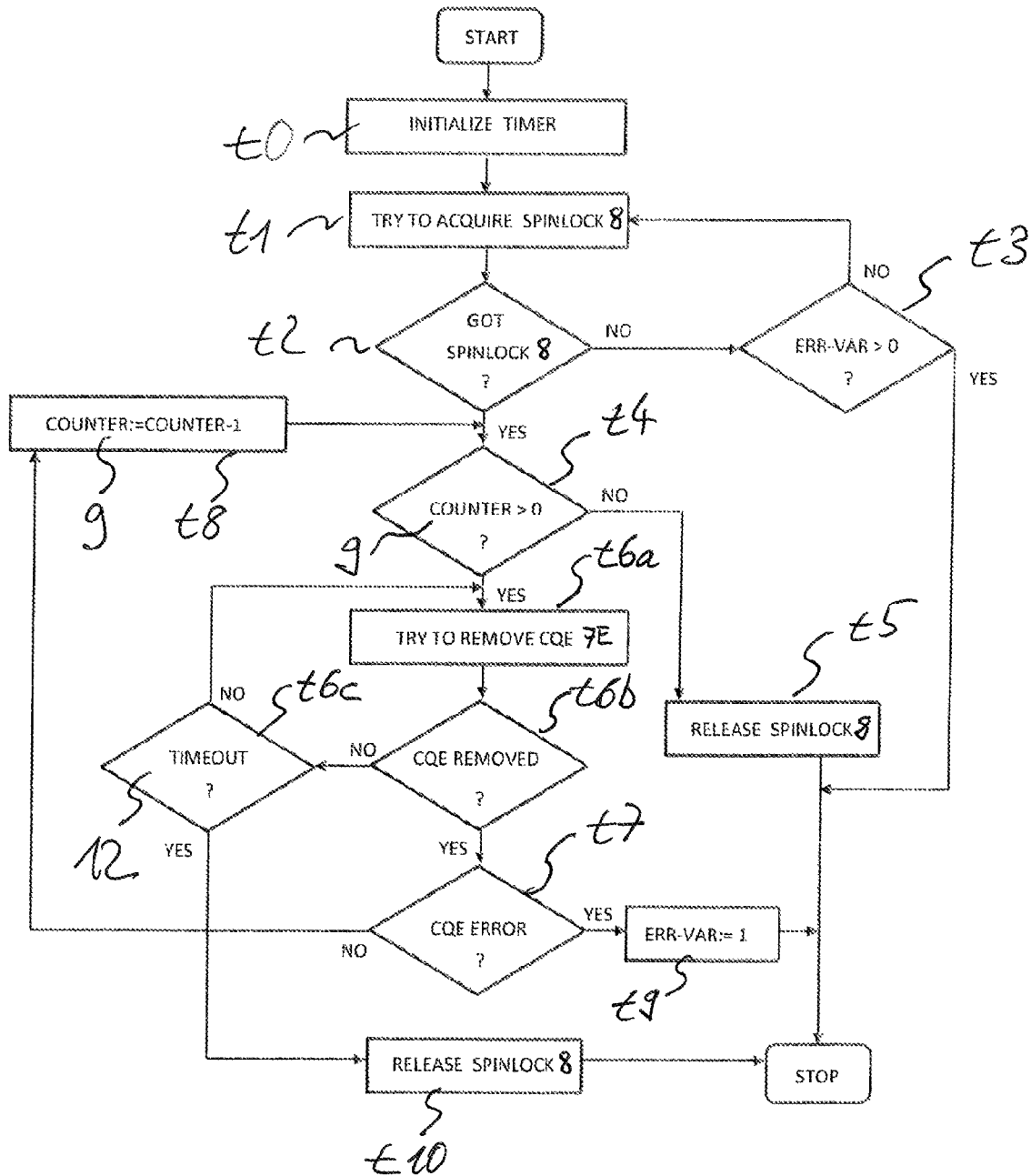

FIG. 10: An example of fault-tolerant operations on the CQ according to the invention.

Figure 11:
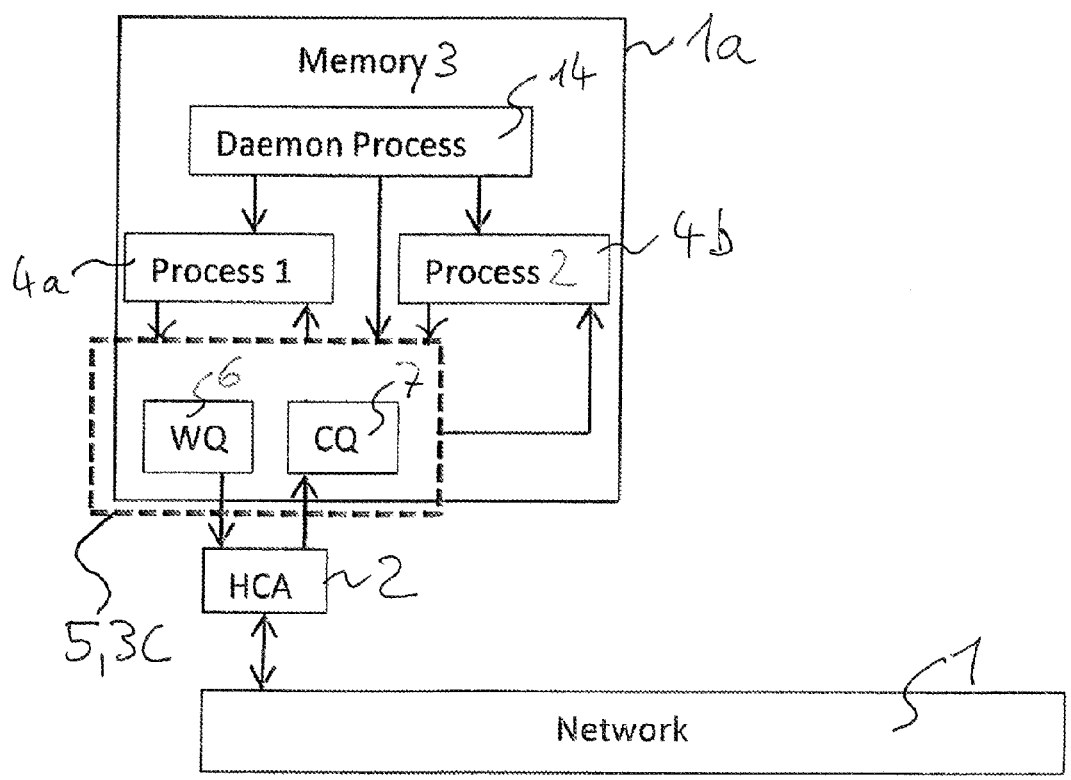

FIG. 11: Another basic structure for a network system of the present invention (with a daemon process).

Figure 12:
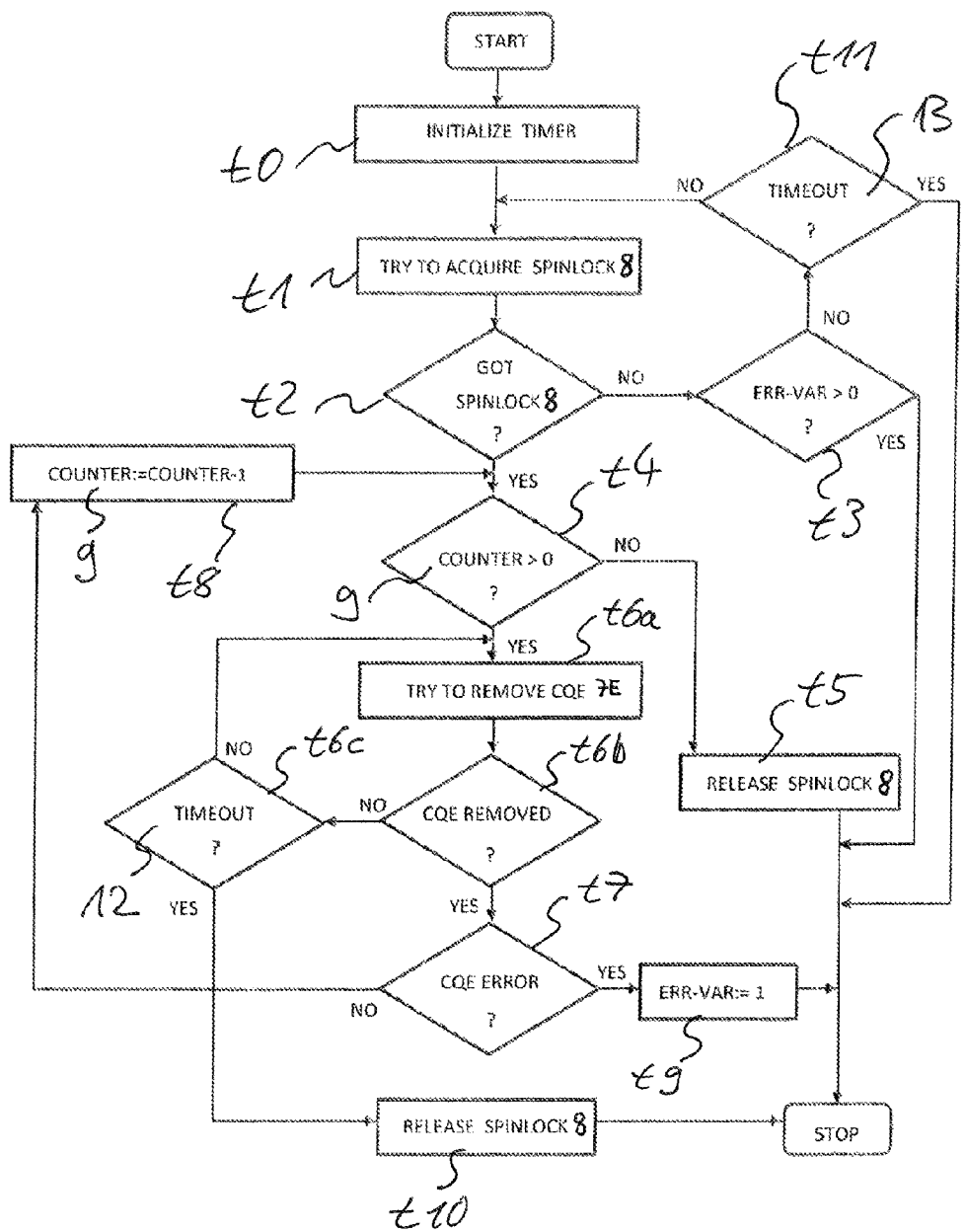

FIG. 12: An example for asynchronous I/O operations on the CQ according to the invention.

Figure 13:
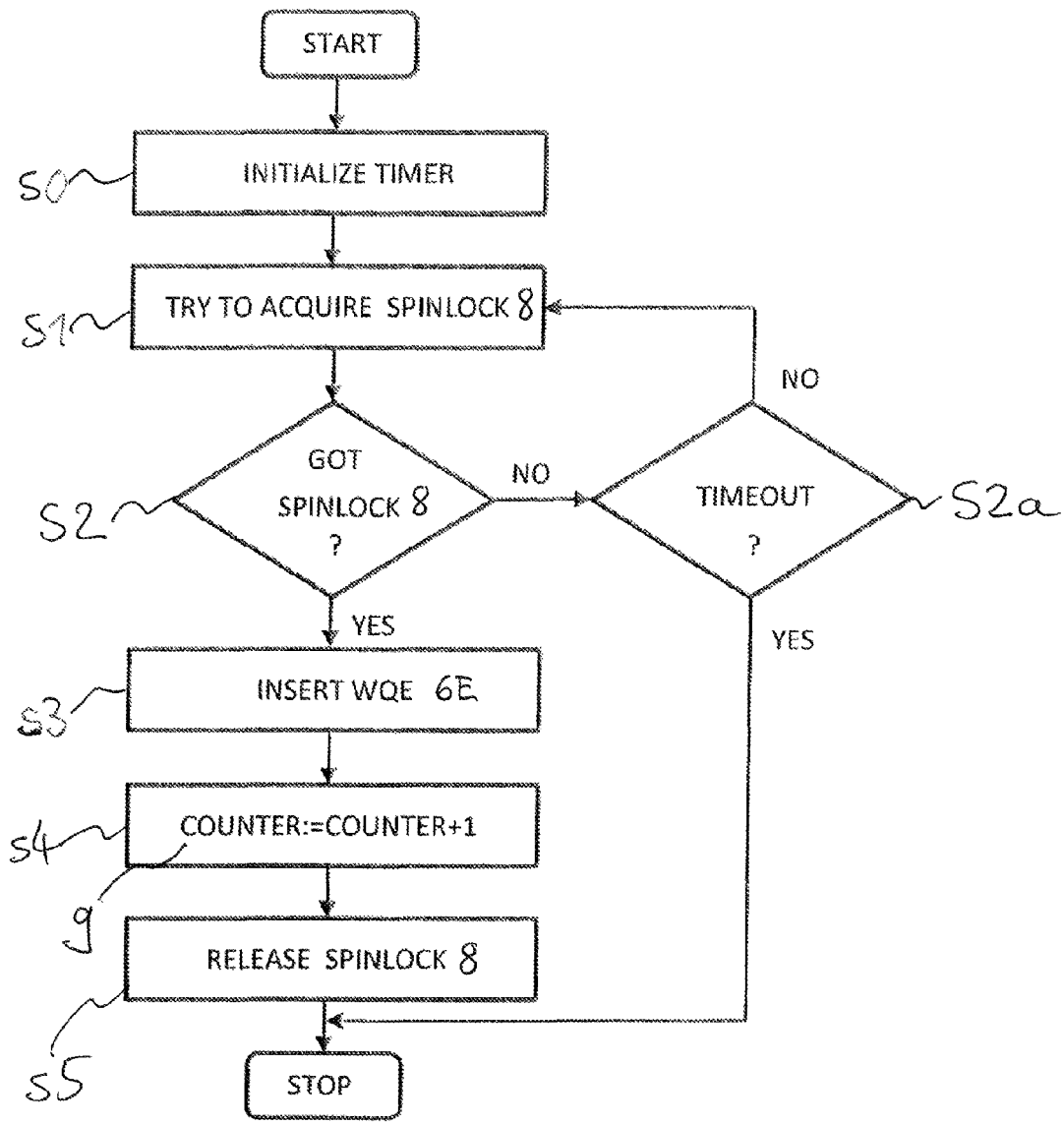

FIG. 13: An example for asynchronous I/O operations on the WQ according to the invention.

FIG. 1 motivates the problem which is solved by the present invention. When multiple processes simultaneously access the queues (WQ and CQ, compare FIG. 2 described hereinafter), non-deterministic communication results can be expected in the prior art. An example for a CQ state and a CQ access is shown in FIG. 1. Two communication processes (P0 and P1) are operating concurrently on the one CQ shown in FIG. 1. Process P0 has insert three I/O commands as WQE into the WQ and process P1 has insert two I/O commands as WQE in the WQ. FIG. 1 shows the status of the five corresponding CQE in the CQ corresponding to the aforementioned WQ. If both processes start simultaneously to remove their three and two, respectively, CQE from the shown CQ, the status of completed I/O commands for both processes will be in general undefined or incorrect in the prior art. If both processes operate successively on the CQ according to the prior art, then process P0 would remove the three CQE CQE_P0a, CQE_P0b and CQE_P1a, and the process P1 would then remove the two CQE CQE_P0c and CQE_P1b, which in turn is also not correct. Also if one would extend the CQE and the WQE with unique process tags to allow an unambiguous mapping of WQE to CQE, the process P0 would remove the four CQE CQE_P0a, CQE_P0b, CQE_P1a, and CQE_P0c, and process P1 would run into a dead lock because CQE_P1a is expected to be available within the CQ.

The subsequent description shows how these problems can be avoided with the present invention.

FIG. 2 shows a minimum configuration of a network system according to the invention. This network system comprises a network node 1a which is connected to a network 1 via a network adapter 2 (in this case, a host channel adapter HCA). Node 1a is therefore connected by the HCA to the underlying network 1.

Network node 1a comprises a memory 3. In this memory, several (independent) processes 4a, 4b, . . . are running which communicate, via HCA 2, with the network 1 (especially with other network nodes connected to network 1, compare FIG. 3).

In the memory 3 of node 1a, a defined, common memory area 3C has been allocated. In this memory area 3C, a common communication channel, the C-channel 5, which is used by the several processes 4a, 4b, . . . for data communication with the network 1 via the adapter 2 is established. The C-channel 5 and the common memory area 3C in the memory 3 of node 1a are both depicted with the dashed line.

The C-channel 5 comprises a WQ 6 for execution of I/O commands of the processes 4a, 4b, . . . and a CQ 7 for indication of a status of the I/O commands of the said processes. Communication processes that can be performed are writing I/O commands as WQE into the WQ and removing CQE from the CQ to query the status of the I/O commands. The HCA 2 operates inverse. WQE are read and removed from the WQ and CQE are written into the CQ when the status is determined.

The specific configuration of the WQ and the CQ together with the synchronization primitive, the unique internal counter (and also the error variable) in the common memory area 3C of memory 3 as described hereinafter allows queue operations between communication processes and the HCA that are unique and well-defined. The WQ 6 and the CQ 7 are implemented based on a ring buffer combined with an atomic counter (see also FIGS. 4 and 5 in conjunction with FIGS. 6, 7, 10, 12 and 13). As only a single process 4a, 4b, . . . (or a thread) operates on the two separated queues WQ and CQ at a time, ordered program behavior is given. Consequently, concurrent access to the WQ and to the CQ by multiple processes 4a, 4b, . . . is realized in a form in which the communication status of all participating processes is always unique and well-defined.

According to the invention, this is done by combining the WQ and the CQ (as illustrated in FIG. 2) and transferring them into a common communication channel 5 which is provided with a unique synchronization primitive (for example mutex or spinlock), a unique internal counter (COUNTER) and an error variable (ERR-VAR) as described below.

FIG. 3 shows an example of a network system according to the invention which comprises several different network nodes which are respectively connected to the network 1 via network adapters 2. Each of the nodes (only two nodes 1a and 1b are shown) are configured in conformity with the node 1a shown in FIG. 2. The different nodes are connected, via the network 1, by network paths 10 (see FIG. 10).

FIGS. 4 and 5 show (for the configurations shown in FIGS. 2 and 3) the implementation of the WQ and of the CQ of common communication channel 5 in its common memory area 3C by means of two ring buffers, a first ring buffer 6R for the WQ 6 and the WQE 6E thereof and a second ring buffer 7R for the CQ 7 and the CQE 7E thereof. The process 4a of an application writes a WQE into an empty bin of the WQ to trigger an I/O operation. The WQE is read (FIG. 4) and removed from non-empty bins of the WQ by the network adapter 2 in order to perform communication via the network 1. According to FIG. 5, the network adapter 2 writes a CQE 7E into an empty bin of the CQ 7 (and the ring buffer 7R thereof, respectively). The calling process 4a of the application then reads and removes the CQE 7E from non-empty bins of the CQ 7 to get the I/O-status.

With the two aforementioned queues 6, 7 and their ring buffers 6R, 7R, the present invention realizes asynchronous I/O operations: The WQ is provided with the instruction to be executed (for example: write data) and later on, the application inquires the status of this instruction to be processed via the CQ 7. Both queues are therefore operating in an inverse manner and an I/O operation is triggered by the application (and a process 4a thereof, respectively) by inserting a WQE in the ring buffer 6R of the WQ 6. The network adapter 2 reads the instructions to be processed from the ring buffer 6R and then performs the communication. The status is written, by the network adapter 2, in the second ring buffer 7R as CQE 7E. Based on the completion queue elements 7E which are present in the ring buffer 7R, the application process 4a can inquire the status. As two different entities (i.e. the application process 4a and the network adapter 2) operate on the ring buffers 6R and 7R, the ring buffers 6R and 7R provide atomicity. The basics of how to implement a ring buffer with atomicity are described in "lock-free multi-producer multi-consumer queue on ring buffer", Linux Journal 2013, issue April 2013, page 104 and the following pages which is hereby incorporated by reference in its entirety.

FIG. 6 shows an example for the insertion of a WQE 6E into the aforementioned WQ 6. FIG. 7 shows an example for the removal of a CQE 7E from the aforementioned CQ 7.

The aforementioned, common communication channel 5 therefore defines two operations according to the invention: A first operation OP1, as an insertion of a WQE into the WQ (FIG. 6), and a second operation OP2, as a removal of an active CQE and status queries (FIG. 7).

According to FIG. 6, in a first step S1, process 4a tries to acquire a unique synchronization primitive of the C-channel 5, in this case a spinlock 8. If process 4a got the spinlock in step S2 (otherwise, it continues trying to acquire the spinlock 8), the WQE 6E is inserted in the WQ 6 in step S3. Afterwards, in step S4, the unique internal counter 9 (COUNTER) is increased by 1. (Counter 9 has been initialized, at the start of the shown procedure, to 0). Afterwards, in step S5, that means when the process 4a has finished the delegation of its I/O commands, the spinlock 8 is released so that the shown process (i.e. the exclusive access of process 4a to the WQ 6 of the C-channel 5) is finished. Then, another process different from process 4a may get exclusive access to WQ 6.

FIG. 7 shows the corresponding removal of CQE 7E from the CQ 7. As can be seen, the C-channel 5 provides, in its common memory area 3C in which the WQ 6 and the CQ 7 (and the ring buffers 6R and 7R thereof, respectively) are realized, precisely one single synchronization primitive for both queues, the WQ 6 and the CQ 7, of the C-channel 5 (in this example: the spinlock 8). That means that an operation on the CQ 7 will lock the corresponding WQ 6 of the C-channel 5 for all other processes and vice versa.

As can be seen in FIG. 7, the removal of a CQE from the CQ starts in step t1 with the attempt to acquire the spinlock 8. In step t2, it is checked whether the spinlock 8 could be acquired. If this is not the case, the error variable ERR-VAR is checked in step t3. If there has not been an error (that means ERR-VAR remains 0, i.e. still contains its initialization value), then the procedure proceeds again to step t1 and continues the attempt to acquire spinlock 8. If there has been an error (ERR-VAR>0), the procedure is finished without exclusive access.

If access to the spinlock 8 has been granted in step t2, the procedure continues with step t4 in which it is checked whether the unique internal counter 9 is larger than 0 (if this is the case, the CQ still contains at least one CQE which will be, according to the invention, removed from the CQ; otherwise there is no CQE left in the CQ). If step t4 determines that there is no CQE left, the spinlock 8 is released in step t5 (and the exclusive access is terminated so that other processes are now allowed to access the CQ) and the procedure is finished.

If step t4 determines based on counter 9 that there is at least one CQE 7E in the CQ 7, then the next CQE 7E in ring buffer 7R of the CQ 7 (compare FIG. 5) is removed in step t6. If, during said removal, an error occurs (which is checked in step t7), the error variable ERR-VAR is set to 1 in step t9 and the procedure is finished without releasing the spinlock 8. That means that no other process can have access to the CQ 7 and to the C-channel 5 thereof (so that, for further communication, another C-channel 5 must be established). If there is no error in step t7, the unique counter 9 is decreased by 1 in step t8 and the process returns to step t4 and continues accordingly.

Consequently, if all CQE 7E present in the CQ 7 can be removed without error, step t4 determines that the counter is 0, so that the spinlock is released in step t5 and the process is finished. Then, unique access by another process is possible.

The system configuration shown in FIGS. 2 to 7 allows only single process operations on the WQ or the CQ at a time and the individual process-related WQE and CQE get abstracted by an internal counter. This counter 9 and the error variable are initialized to 0, the synchronization primitive is unlocked. If a process which desires to communicate to the network 1 via the network adapter wants to add a WQE into the WQ, this process needs an exclusive ownership of the synchronization primitive 8. The synchronization primitive 8 of the C-channel 5 ensures that no concurrent process can access the corresponding WQ (the same applies to the CQ): because C-channel 5 comprises (or consists of) exactly one single WQ and one single CQ, an operation on one of these two queues 6, 7 necessarily requires the passing of the synchronization primitive 8 which is therefore locked so that also the corresponding, other queue is locked. Consequently, operations on the CQ will lock the corresponding WQ for all other processes and vice versa.

As FIG. 7 shows, all CQE (that means independent of the ownership of the CQE) for all processes are removed when the precisely one single process having exclusive access operates on the CQ. Thus, in the present invention, the first process/thread removes everything (which is a simple logic for any situation): If other processes/threads access the CQE later on, they will find an empty queue which in turn signals "communication status ok" (all communication(s) done). This simple logic works pretty good (the fastest possible logic) when multiple instances are accessing the queue(s) simultaneously. The current number of active CQE for a given CQ is determined by the internal counter variable.

Both ring buffers 6R, 7R are established, together with the synchronization primitive 8 and the counter 9, in one single, pre-defined memory area. For those instances (process and/or threads) that want to have access, a vector address is visible. That means that there is only one single access and this access is guarded by the internal synchronization primitive 8. WQ and CQ are therefore combined in one single memory area and this memory structure is then extended by the synchronization primitive 8 and the counter 9 (and also ERR-VAR). According to FIGS. 6 and 7, single communication results are no longer regarded by the present invention: for the application, it is only interesting that the communication status of all I/O commands which have been released by the application in the past is error-free.

It is possible to realize several C-channels 5 in one and the same network node. Each of these C-channels 5 can be implemented as described in the aforementioned sections. Each queue and its respective ring buffer can contain a fixed number of queue elements, that means that the number of WQE and CQE that can be inserted in the corresponding queues equals this fixed number.

An advantage of the present invention is that processes no longer need to monitor the number of I/O commands. If a process runs operation OP2 on the C-channel 5, it is ensured that the status of all previously applied I/O commands is well-defined and known. It is also possible that CQE of other processes are checked and removed from the queue, but the overall data communication stays correct for all involved instances. Using the example from FIG. 1, this can be easily shown: if process P1 performs at first operation OP2, it will check and remove (after processing the corresponding CQ), five active CQE determined by the internal counter 9. All relevant CQE for process P1 (that is CQE_P1a and CQE_P1b) are processed and the communication status is well-defined with respect to the underlying C-channel 5. Afterwards, process P0 performs operation OP2. However, the internal counter value is 0 and no CQE must be processed. The communication status of P0 is also unique and well-defined since process P1 has already processed the three corresponding CQE of process P0, that is CQE_P0a, CQE_P0b and CQE_P0c. The aforementioned, distributed C-channel management according to the invention has a high relevance in practice as parallel program execution is usually divided into phases such as calculation, synchronization and communication at which the calculation phase is never perfectly balanced. This imbalance during program run time can now be used efficiently: The first process that enters the synchronization phase (after completion of calculations) does the full work on the CQ. This allows the overlapping of administrative tasks on the C-channel with parallel running calculations of other processes.

If a process detects a communication error on the network while executing OP2, it will not release the locked synchronization primitive of the C-channel and the local error variable (ERR-VAR) is set to 1 (compare FIG. 7). The status of all CQE (given by the initial internal counter value) is undefined and the C-channel 5 cannot be used for additional operations in the future. Processes may need to repeat their I/O commands on other C-channels when the execution of OP2 fails or the error variable is set to 1. However, with the present invention, also fault-tolerant behavior of a broken C-channel can be realized as is described in detail hereinafter (compare FIG. 10).

FIGS. 8 and 9 show how an ordered and deterministic performing of I/O commands on any network 1 can be realized with the present invention.

Networks 1 can be built on various network topologies, connections (the network paths 10a to 10c in the adaptive message transport example of FIG. 8 between network nodes 1a to 1c) are either static or adaptive and can also be changed during run time. Run time path manipulations (adaptive routing) can lead to problems if only a chronological and deterministic communication pattern guarantees for a stable program execution. FIGS. 8 and 9 show how the present invention overcomes these problems.

In the scenario of FIG. 8, network node 1a sends a large message and shortly afterwards a short message to network node 1b. Various networks can optimize these data transports in which they turn on different network paths in parallel. Here, the short message is routed via node 1c which may result in a condition where the short message arrives before the large message is available at network node 1b. If, in the context of the executing application, a temporal dependency exists between both messages (for example: the short message indicates that the large message has already been sent and is available for use at network node 1b), an erroneous program execution will be the result.

In order to avoid this, i.e. in order to perform an ordered and deterministic performing of all I/O commands on the network 1 in any network topology, the C-channel 5 according to the present invention as has already been described in the previous sections is extended by a new type of WQE as is shown in FIG. 9 (extended WQE, EWQE). The EWQE can comprise a list LWQE of several WQE and an ordered standard WQE, i.e. an OWQE, which operates as follows. If an OWQE is found within the WQ, the normal WQ processing must be interrupted. All pre-assigned WQE of this WQ must be processed and the communication status has to be determined (the corresponding CQE must be consumed). The easiest way is just to empty the corresponding CQ. The number of expected CQE (the number of open I/O-operations) is given by the internal counter. This guaranties, that an OWQE is in order. That is, data in memory will show up after all prior I/O-operations.

When an EWQE is added according to the invention to the WQ of the C-channel 5, the calling process 4a has to execute all WQE of the list (LWQE in FIG. 9—this list contains several WQE or pointers thereto) first. If the underlying network 1 can work on these lists directly, the LWQE is inserted into the WQ as a normal WQE and the counter 9 is increased by 1. If lists of WQE are not supported by the network 1, all WQE are inserted separately into the WQ and the internal counter of C-channel is increased by the number of WQE. Afterwards, the process 4a operates directly on the corresponding CQ and removes all active CQE from it. The current number of active CQE is given by the internal counter 9. Due to the ownership of the synchronization primitive 8, the calling process 4a (or 4b, ... ) has exclusive access to the CQ 7 and no other process or thread can interrupt this access. Even if the data transport is arbitrarily ordered, it is guaranteed that all related I/O commands are processed and corresponding messages are visible at the destination nodes. Finally, the ordered WQE (OWQE in FIG. 9) is added to the WQ 6. The transport over the network 1 can be in turn arbitrary, but is now ordered chronologically in relation to the LWQE. The extended WQE of FIG. 9 and the exclusive access to both C-channel queues 6, 7 allow the present invention to send ordered messages over any network topology.

As shown in FIG. 10, the present invention can also realize fault-tolerant operations on the CQ 7.

Generally, networks 1 are splitting the data communication in two phases: a first, initiating phase and a second, query phase. This allows an efficient overlap of computation and data transport. One disadvantage of this separation is that communication errors only become visible when a process operates on a given CQ 7. Analyzing a CQE 7E is the only way for communication processes to detect network failures if the underlying transport network (which is commonly the case) reports failures encapsulated within the CQE. If serious problems occur within the transport network (for example: hardware failures), it may happen that no CQE with a corresponding error code will be generated and communicated from the network 1 via the HCA 2 to the C-channel and its CQ, respectively (and therefore to the corresponding process such as the process 4a).

Before a process 4 starts operations on a CQ 7, it reads the internal counter to get the number of outstanding CQE 7E. If one or more CQE has/have not been inserted into the CQ 7, a deadlock results (for example, the step t6 "REMOVE CQE 7E" locks forever, compare FIG. 7). To avoid this situation, an advantageous embodiment of the present invention provides a timer and timer function, respectively, in the CQ (FIG. 10).

As can be seen in FIG. 10, at first (step t0) the timer of the timer function 12 is initialized. Thereafter, the removal of the CQE from the CQ is in principle performed as has already been described with respect to FIG. 7 (so that only the differences of the procedure in FIG. 10 are described hereinafter, whereas the description of all steps which already have been described in FIG. 7 is omitted).

After performing (after step t0), steps t0 to t4 as has been described with respect to FIG. 7, step t6 of FIG. 7 is replaced by steps t6a to t6c as shown in FIG. 10: If the outcome of step t4 is that counter 9 is larger than 0, firstly, removing of a CQE 7E is tried in step t6a. In step t6b, it is then judged whether the CQE removal was successful (if this is the case, the process further continues with step t7 as already described with respect to FIG. 7). If the CQE removal was not successful in step t6b, in step t6c, the timer function 12 of the shown embodiment is invoked: The timer function checks in step t6c whether a predetermined time after the initializing of the timer (step t0) has passed. If not, the process returns, from step t6c, to the step t6a and continues trying to remove the momentarily processed CQE. Otherwise, i.e. if the time which has passed since the initializing of the timer in step t0 is larger than the predetermined time, the process jumps from step t6c to step t10 and releases the spinlock 8. In this case, the exclusive access is unlocked and a further process can acquire the spinlock 8. As can be seen from FIG. 10, if one of steps t3 and t7 judges that there has been an error (if this is judged by step t7, step t9 sets ERR-VAR to 1), the process finishes without releasing spinlock 8.

In the shown embodiment, the execution time of a process 4a, 4b, ... with the CQ 7 is limited. Consequently, deadlock situations can be avoided and the total operation time is limited by the time frame (predetermined time) of the timer function 12. The operation "TRY TO REMOVE CQE 7E" in step t6a only removes existing entries (i.e. still existing CQE) from the CQ and is non-blocking. This extension to the system shown in FIG. 7 allows ordered and fault-tolerant operations on the CQ 7.

In the present invention, it can be advantageous to expand the network nodes 1a, 1b, 1c as shown in the embodiment of FIG. 11 in order to realize a simple error management (i.e. to establish new C-channels between elements such as the network nodes of the network system so that an erroneous communication can be repeated).

In order to do so, a daemon process 14 (such as the one shown in FIG. 11) can be used in the network nodes. The basic structure of this embodiment is shown in FIG. 11 which is an extension of the structure shown in FIG. 2 so that only the differences are now described (of course, normally, several network nodes are used; in this case, the network nodes 1a and 1b shown in FIG. 3 are to be replaced by nodes constructed as the network node 1a in FIG. 11).

The basics of daemon processes 14 are described in the Article "Daemon (Computing)" of the English part of "Wikipedia—the Free Encyclopedia" in the version last modified on 15 Oct. 2013 at 04:50, which is hereby included by reference in its entirety.

According to FIG. 11, in case of an error, a one-sided, consistent error correction according to the invention is realized by providing exclusive access to the communication end points (all network nodes). This exclusive access includes the ownership of all affected synchronization primitives 8. The node 1a shown in FIG. 11 uses the daemon process, i.e. a background process, 14 to get access to remote C-channels 5 of other network nodes. The background process 14 has direct access to the synchronization primitives 8 thereof and can control the connected communication process. (How an access of a process residing in a first network node to the C-channel 5 of a second, remote network node other than the first network node can be performed is well-known by the skilled person and for example described in aforementioned three state of the art documents "InfiniBand Architecture Specification" and "CrayDoc" which are therefore incorporated by reference in their entirety in the present application).

If exclusive access to all synchronization primitives of all communication end points (network nodes) is established in accordance with FIG. 11, two strategies for a transparent error handling are possible: internal migration to a new C-channel or internal migration to a secondary network. Therein, for example, each network node is provided with one, two or more network adapters 2. If there are communication problems in the network 1, then, new C-channels have to be established in accordance with the present invention. Those communication processes which are erroneous have to be repeated via the newly established C-channels 5. As the network adapters 2 are connected with the C-channel 5 (i.e. the WQ and the CQ thereof), if one network adapter 2 is faulty, the process simply changes from the faulty network adapter 2 to another, correctly operating network node 2. The faulty network adapter 2 can be determined via the defective C-channel.

If remote daemon processes 14 are not available or exclusive access to the synchronization primitives 8 of all affected network nodes 1a, 1b, . . . cannot be established, an ordered termination of all remaining and accessible communication end points (network nodes) can be executed.

A further embodiment (which is shown in FIGS. 12 and 13) of the invention describes a system extension which enables, besides the error handling of broken C-channels, also asynchronous queries of the CQ. The basic process of removal of the CQE from the CQ (which is shown in FIG. 12) is similar as the process shown in FIG. 10, so that only the differences to FIG. 10 are now described. Also, the process for insertion of the WQE into the WQ is similar to the process shown in FIG. 6 so that only the differences to FIG. 6 are described hereinafter (compare FIG. 13).

According to FIG. 12, if, in step t3, the ERR-VAR is not >0 (i.e. if no error has been detected), the process does not directly return to step t1, but performs step t11 in accordance with an additional timer function 13 of this process. According to timer function 13, in step t11, it is determined whether the time that has passed since initialization of the timer (in step t0) is larger than a predetermined time (which is the same time as used by step t6c in the timer function 12). If the passed time is below the said predetermined time, the process returns to step t1 and continues trying to acquire the spinlock 8. If not (i.e. if, since initialization of the timer in step t0, a time larger than the predetermined time has passed), step t11 of the shown process immediately finishes the process and exclusive access, respectively.

With respect to WQ 6, as shown in FIG. 13, if the spinlock 8 cannot be acquired in step S2, different to FIG. 6, the process does not directly return to step S1, but performs step S2a of another timer function: in this step S2a, it is determined whether a predetermined time (which can be the aforementioned predetermined time) has passed since the initialization of the timer in the additional step S0 (which has been performed before step S1, i.e. immediately after the process start) or not. If the predetermined time has not passed yet, the process returns to step S1 and continues trying to acquire the spinlock 8. Otherwise, i.e. if there is a timeout, step S2a immediately finishes the process (and no spinlock releasing is done because the attempts to acquire the spinlock 8 have not been successful).

The processes shown in FIGS. 12 and 13 have the following advantages: concurrent access to the C-channel 5 may lead to blocking communication processes when the synchronization primitive 8 is currently locked. To overlap this waiting period with other tasks, the timer functionality is provided in the network system as shown in FIGS. 12 and 13, i.e. the timer functionality introduced above is also applied in addition to the synchronization primitive 8. Communication processes can therefore setup the timer to do asynchronous queries on the CQ without blocking for too long. This enables the overlapping of calculations with operations on the C-channel. Consequently, a time budget (timeout) is set for the inquiry. If, within the time window between time initialization of the timer and the predetermined time, there has not been a result (for example a communication partner did not send something), the CQ will be left and other tasks can be processed.

Furthermore, asynchronous collectives (collective operations as described in "Fabric Collective Accelerator" in http://www.mellanox.com/related-docs/prod_acceleration-_software/FCA.pdf) can be implemented easily via the timeout-mechanism in FIGS. 12 and 13. Using the timer as shown in FIGS. 12 and 13, the following asynchronous collectives are supported: barrier, scatter-gather, reduce, all-to-all and broadcast. Collective operations that can be derived from these basic types can also be implemented.

Especially, the present invention can be realized in accordance with the following claims:

What is claimed is:

1. A network system to execute I/O commands and application commands in parallel the network system comprising a network and at least one network node, the at least one network node including a processor and memory,
   wherein the at least one network node is connected to the network via a network adapter and is to run several processes and/or threads in parallel,
   wherein the at least one network node establishes, in the memory, a common communication channel (C-channel) to be used by the several processes and/or threads for data communication with the network via the network adapter,
   wherein the C-channel comprises a work queue (WQ) for execution of I/O commands and a completion queue (CQ) for indication of a status of I/O commands, and
   wherein the at least one network node is to assign exclusive access of precisely one single process or thread out of the several processes and/or threads to the CQ of the C-channel at a particular time,
   wherein the network system includes several network nodes which are connected, in the network system, by network paths with each, other and which are configured in conformity with the at least one network node, and wherein at least one of the several network nodes is configured to run a daemon process which is configured to alloy/the at least one of the several network nodes to get access to the C-channel of another one of the several network nodes.

2. The network system according to claim 1, wherein the at least one network node, especially its comprised or to be established C-channel, is configured for an exclusive access of the precisely one single process or thread out of the several processes and/or threads to the CQ and to the WQ of the said C-channel at a particular time.

3. The network system according to claim 1, wherein the WQ and the CQ are established or to be established in a common memory area of the memory of the at least one network node.

4. The network system according to claim 1, wherein at least one of the WQ and the CQ, preferably the WQ and the CQ, is/are implemented or to be implemented based on (a) ring buffer/ring buffers.

5. The network system according to claim 1, wherein the C-channel is configured or to be configured for insertion of working queue elements (WQE) into the $W^T Q$ and for removal of completion queue elements (CQE) from the CQ.

6. The network system according to claim 1, wherein the at least one network node, especially its comprised or to be established C-channel, is configured or to be configured in such a manner that all completion queue elements (CQE) in the CQ will be removed from the CQ by the precisely one single process or thread when the precisely one single process or thread operates on the CQ.

7. The network system according to claim 1, wherein the exclusive access of the precisely one single process or thread to the CQ, to the WQ or to the CQ and the WQ is implemented or to be implemented by a synchronization primitive, wherein preferably the C-channel is provided with or configured to be provided with the synchronization primitive.

8. The network system according to claim 7, wherein the WQ and the CQ are established or to be established in a common memory area of the memory of the at least one network node, and wherein the synchronization primitive is established or to be established together with the WQ and the CQ in said common memory area of the memory of the at least one network node.

9. The network system according to claim 1, wherein the exclusive access of the precisely one single process or thread to the CQ, to the WQ or to the CQ and the WQ is implemented or to be implemented by using a unique counter, wherein preferably the C-channeL is provided or configured to be provided with the unique counter.

10. The network system according to claim 9, wherein the WQ and the CQ are established or to be established in a common memory area of the memory of the at least one network node, and wherein the unique counter is established or to be established together with the WQ and the CQ in said common memory area of the memory of the at least one network node.

11. The network system according to claim 1, wherein the at least one network node, especially its comprised or to be established C-channel, is configured or to be configured in such a manner that if the precisely one single process or thread currently having the exclusive access detects a communication error on the network, the C-channel is blocked for further communication.

12. The network system according to claim 1, wherein the C-channel is configured or to be configured for insertion of working queue elements (WQE) into the WQ and for removal of completion queue elements (CQE) from the CQ, and wherein the at least one network node comprises or is configured to establish several common communication channels (C-channels) which can be used by the several processes and/or threads for data communication with the network via one or more network adapter(s), and/or in that the at least one network node comprises several network adapters for connecting the at least one network node to the network.

13. The network system according to claim 1, wherein the C-channel of at least one network node is configured or is to be configured for handling one or more extended working queue element(s) (EWQE), preferably for inserting the extended working queue element(s) into the WQ, wherein the one or more EWQE comprise(s) a set of several WQE and an execution order defining in which order these several WQE have to be executed or wherein the one or more EWQE comprise(s) pointers to several WQE and to an execution order defining in which order these several WQE have to be executed.

14. The network system according to claim 1, wherein the at least one network node, especially its comprised or to be established C-channel, is provided with a timer function which is configured to limit, for a process or thread entering the CQ, an execution time of said process or thread in the CQ.

15. The network system according to claim 14, wherein the C-channel is configured or to be configured for insertion of working queue elements (WQE) into the WQ and for removal of completion queue elements (CQE) from the CQ, and wherein the timer function is configured as follows:

if the process or thread that entered the CQ tries to remove a non-existing CQE from the CQ, then an exclusive access of said process or thread that entered the CQ is suspended if a predetermined time after initialization of the timer function has passed.

16. The network system according to claim 14, wherein the timer function is configured as follows:

if the process or thread that entered the CQ tries to get the exclusive access, preferably by acquiring a/the synchronization primitive, and if said exclusive access cannot be granted, then the execution time of said process or thread in the CQ is suspended if a predetermined time after initialization of the timer function has passed.

17. The network system according to claim 16, wherein the network system, i.e. all network nodes thereof, is configured for exclusive access of all processes and threads running on any one out of the several network nodes, i.e, if a specific process or thread running on a specific one out of the several network nodes accesses the CQ of an arbitrary one out of the several network nodes, no other process and no other thread running on any one of the several network nodes is allowed to have access to said CQ of said arbitrary one out of the several network nodes at the same time.

18. The network system according to claim 1, further including a network node configured in conformity therewith.

19. A communication method of using a network system to execute I/O commands and application commands in parallel, the network system comprising a network and at least one network node, the at least one network node including a processor and memory, wherein the at least one network node is connected to the network via a network adapter and is configured to run several processes and/or threads in parallel, wherein the at least one network node establishes, in the memory, a common communication channel (C-channel) to be used by the several processes and/or threads for data communication with the network via the network adapter, wherein the C-channel comprises a work queue (WQ) for execution of I/O commands and a completion queue (CQ) for indication of a status of I/O commands, and wherein the at least one network node is to assign exclusive access of precisely one single process or thread out of the several processes and/or threads to the CQ of the C-channel at a particular time, the method comprising:

providing the network system being configured to execute I/O commands and application commands in parallel, and in which the at least one network node of this network system is connected to the network of the network system via the network adapter of the network system and is confi gured to am several processes and/or threads in parallel; and providing the at least one network node being configured to establish a common communication channel (C-channel) to be used by the several processes and/or threads for data with the network via the network adapter in such a manner that the C-channel comprises a work queue (WQ) for execution of I/O commands and a completion queue (CQ) for indication of a status of I/O commands, in that the at least one network node, in the established C-channel, is configured for an exclusive access of precisely one single process or thread out of the several processes and/or threads to the CQ of the C-channel at a particular time, and in that the C-channel is used by the several processes and/or threads for data communication with the network via the network adapter, wherein the network system includes several network nodes which are connected, in the network system, by network paths with each other and which are configured in conformity with the at least one network node, and wherein at least one of the several network nodes is configured to run a daemon process which is configured to allow the at least one of the several network nodes to get access to the C-channel of another one of the several network nodes.

* * * * *